United States Patent
Chun et al.

(10) Patent No.: US 9,357,518 B2
(45) Date of Patent: May 31, 2016

(54) METHOD FOR REGISTERING WSO IN COEXISTENCE NETWORK

(71) Applicant: LG ELECTRONICS INC., Seoul (KR)

(72) Inventors: Jinyoung Chun, Anyang-si (KR); Suhwook Kim, Anyang-si (KR); Jinho Kim, Anyang-si (KR); Wookbong Lee, Anyang-si (KR); Jinsam Kwak, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/380,345

(22) PCT Filed: Jan. 30, 2013

(86) PCT No.: PCT/KR2013/000756
§ 371 (c)(1),
(2) Date: Aug. 21, 2014

(87) PCT Pub. No.: WO2013/133534
PCT Pub. Date: Sep. 12, 2013

(65) Prior Publication Data
US 2015/0038139 A1 Feb. 5, 2015

Related U.S. Application Data

(60) Provisional application No. 61/607,611, filed on Mar. 7, 2012.

(51) Int. Cl.
*H04W 60/00* (2009.01)
*H04W 16/14* (2009.01)
(Continued)

(52) U.S. Cl.
CPC ............ *H04W 60/00* (2013.01); *H04W 16/14* (2013.01); *H04W 48/10* (2013.01); *H04W 88/06* (2013.01)

(58) Field of Classification Search
CPC ..... H04W 60/00; H04W 16/14; H04W 48/10; H04W 88/06
See application file for complete search history.

(56) References Cited

U.S. PATENT DOCUMENTS

2010/0220687 A1* 9/2010 Reznik et al. ............... 370/331
2011/0280180 A1* 11/2011 McCann et al. ............. 370/328
(Continued)

FOREIGN PATENT DOCUMENTS

WO 2012/003566 1/2012
WO 2012/005557 1/2012

OTHER PUBLICATIONS

PCT International Application No. PCT/KR2013/000756, Written Opinion of the International Searching Authority dated May 24, 2013, 21 pages.
(Continued)

*Primary Examiner* — Leon Flores
(74) *Attorney, Agent, or Firm* — Lee, Hong, Degerman, Kang & Walmey; Jonathan Kang; Michael Monaco

(57) ABSTRACT

Provided is a method for registering TVWS devices for coexistence of television white space (TVWS) devices in a television white space (TVWS), the method performed a server and comprising receiving a registration request message for registration or update registration of at least one TVWS device from at least one management device; performing the registration or update registration of at least one TVWS device; and in response to the registration request message, transmitting a registration response message to the at least one management device, wherein the registration response message includes at least one of an identifier field of an interface device connected to the at least one TVWS device, a status field indicating a result of the registration or the update registration, and a reason field indicating a reason why the registration or the update registration is failed if the registration or the update registration is failed.

16 Claims, 13 Drawing Sheets

(51) Int. Cl.
*H04W 48/10* (2009.01)
*H04W 88/06* (2009.01)

(56) References Cited

U.S. PATENT DOCUMENTS

2011/0280227 A1* 11/2011 McCann et al. ............. 370/338
2011/0280228 A1* 11/2011 McCann et al. ............. 370/338
2011/0282915 A1 11/2011 Steer et al.
2011/0310815 A1 12/2011 Kim et al.
2012/0195269 A1* 8/2012 Kang et al. .................. 370/329
2012/0233635 A1* 9/2012 Hakola et al. ................ 725/25

OTHER PUBLICATIONS

PCT International Application No. PCT/KR2013/000756, Written Opinion of the International Searching Authority dated May 24, 2013, 1 page.

* cited by examiner (a)

(b)

(a)

(b)

(a)

(b)

METHOD FOR REGISTERING WSO IN COEXISTENCE NETWORK

CROSS-REFERENCE TO RELATED APPLICATIONS

This application is the National Stage filing under 35 U.S.C. 371 of International Application No. PCT/KR2013/000756, filed on Jan. 30, 2013, which claims the benefit of U.S. Provisional Application Ser. No. 61/607,611, filed on Mar. 7, 2012, the contents of which are hereby incorporated by reference herein in their entirety.

TECHNICAL FIELD

The present invention relates to WSO (white space object) registration in a coexistence network, and more particularly, to a method and apparatus for registering WSO using messages for the WSO registration.

BACKGROUND ART

Conventionally, frequency distribution for new services and frequency distribution to new service providers are lead by the government. In particular, when there are new service providers, new frequencies are allocated via auction or the like or existing frequencies are revered from existing service providers and rearranged to new service providers so as to distribute frequencies as limited resources.

However, as recent explosive growth in radio data traffic has occurred due to spread of various Internet based applications such as an open type terminal platform, App store, mobile VoIP, etc., such frequency distribution lead by the government is very ineffective and it becomes more difficult to ensure new frequencies on a frequency distribution table basically.

In particular, along with rapid growth of broadcast and communication systems, a next-generation communication system is designed in the form of fusion of various networks and becomes more complex, and a need for coexistence is gradually expanded. Along with the development of communication technologies and services, as frequency of usage of frequency resources increases and specific frequency bands are fixedly occupied in order to provide excellent communication technologies and services, frequency exhaustion issues are in a critical situation.

Recently, frequency sharing schemes have been proposed as a method for overcoming the above issues. Among the schemes, a technology for searching for idle resources (a spectrum hole or white space) that have a low frequency of usage and are not occupied from a temporal/spatial point of view among frequency bands allocated to an unlicensed band in a TV broadcast band and adaptively and opportunistically using the idle resources has been proposed. In this case, when a primary user having a license for a corresponding band is discovered, the primary user should not be interrupted by immediately stopping use of the corresponding band or adjusting transmit power. A system for frequency sharing using the idle resources is referred to as a television band device (TVBD) or television white space (TVWS) system, and networks or devices using shared frequency resources in the system are referred to as TVBD or TVWS networks or devices.

Meanwhile, when a response to a registration request from the TVWS networks or devices (in other words, WSO (white space object)) indicates failure, an entity which attempted to request the registration can re-attempt to request the registration. However, if capacity of the entity which accept the registration, the re-attempt will be failed. Accordingly, in order to avoid unnecessary attempt to request the registration, WSO registration procedure and messages for the procedure need to be defined.

DISCLOSURE

Technical Problem

An object of the present invention devised to solve the problem lies in WSO registration procedure and messages for the procedure in the coexistence network It is to be understood that both the foregoing general description and the following detailed description of the present invention are exemplary and explanatory and are intended to provide further explanation of the invention as claimed.

Technical Solution

The object of the present invention can be achieved by providing A method for registering TVWS devices for coexistence of television white space (TVWS) devices in a television white space (TVWS), the method performed a server and comprising receiving registration request message for registration or update registration of at least one TVWS device from at least one management device; performing registration or update registration of at least one TVWS device; and in response to the registration request message, transmitting registration response message to the at least one management device, wherein the registration response message includes at least one of an identifier field of an interface device connected to the at least one TVWS device, a status field indicating a result of the registration or the update registration, and a reason field indicating a reason why the registration or the update registration is failed if the registration or the update registration is failed.

Additionally or alternatively, the reason field may be set to 1 if the number of TVWS devices which the server is capable to register is same as the maximum number of TVWS devices, and the reason field may be set to 2 if information of the registration or the update registration is wrong.

Additionally or alternatively, the registration request message may include at least one of the maximum number of TVWS devices that can be controlled by the management device, a geo-location and coverage radius of the management device.

Additionally or alternatively, if the registration or the update registration is successfully performed, the status field may be set to success; and if the registration or the update registration is not successfully performed, the status field may be set to failure.

Additionally or alternatively, if the registration or the update registration is successfully performed, the identifier field of the registration response message may further include an identifier of an interface device connected to at least one TVWS device for which the registration or the update registration is successfully performed.

Additionally or alternatively, if the registration or the update registration is not successfully performed, the identifier field of the registration response message may further include an identifier of an interface device connected to at least one TVWS device for which the registration or the update registration is not successfully performed.

Additionally or alternatively, the transmitting registration response message to the at least one management device may include transmitting an identical registration response message to at least two management devices.

Additionally or alternatively, registration response messages may be identical for management devices which have transmitted the registration request message for the TVWS devices for which a result of the registration or the update registration is success.

Additionally or alternatively, registration response message may be identical for management devices which have transmitted the registration request message for the TVWS devices for which a result of the registration or the update registration is failed.

In another aspect of the present invention, provided herein is a method for registering TVWS devices for coexistence of television white space (TVWS) devices in a television white space (TVWS), the method performed a management device and comprising: receiving a first registration request message for registration or update registration of a TVWS device from at least one interface device connected to the TVWS device; transmitting a second registration request message for the registration or the update registration to a server based on the first registration request message, the registration or the update registration being performed by the server in response to the second registration request message; receiving a first registration response message from the server in response to the second registration request message; and performing the registration or the update registration based on the first registration response message, and transmitting a second registration response message to the at least one interface device, wherein the first registration response message includes at least one of an identifier field of an interface device connected to the TVWS device, a status field indicating a result of the registration or the update registration, and a reason field indicating a reason why the registration or the update registration is failed if the registration or the update registration is failed.

Additionally or alternatively, the reason field may be set to 1 if the number of TVWS devices which the server is capable to register is same as the maximum number of TVWS devices, and the reason field may be set to 2 if information of the registration or the update registration is wrong.

Additionally or alternatively, the first registration request message may include an identifier (ID) or a serial number (SN) of the TVWS device Additionally or alternatively, the second registration request message may include at least one of the maximum number of TVWS devices that can be controlled by the management device, a geo-location and coverage radius of the management device.

Additionally or alternatively, if the registration or the update registration is successfully performed by the server, the status field of the first registration response message may be set to success, and if the registration or the update registration is not successfully performed, the status field of the first registration response message may be set to failure.

Additionally or alternatively, if the registration or the update registration is successfully performed by the server, the identifier field of the first registration response message may further include an identifier of an interface device connected to at least one TVWS device for which the registration or the update registration is successfully performed.

Additionally or alternatively, if the registration or the update registration is not successfully performed by the server, the identifier field of the first registration response message may further include an identifier of an interface device connected to at least one TVWS device for which the registration or the update registration is not successfully performed.

Additionally or alternatively, if the number of TVWS devices which the management device is capable to register is same as the maximum number of TVWS devices, the second registration request messages may be not transmitted to the server.

It is to be understood that both the foregoing general description and the following detailed description of the present invention are exemplary and explanatory and are intended to provide further explanation of the invention as claimed.

Advantageous Effects

According to embodiments of the present invention, WSO registration procedure is performed efficiently.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
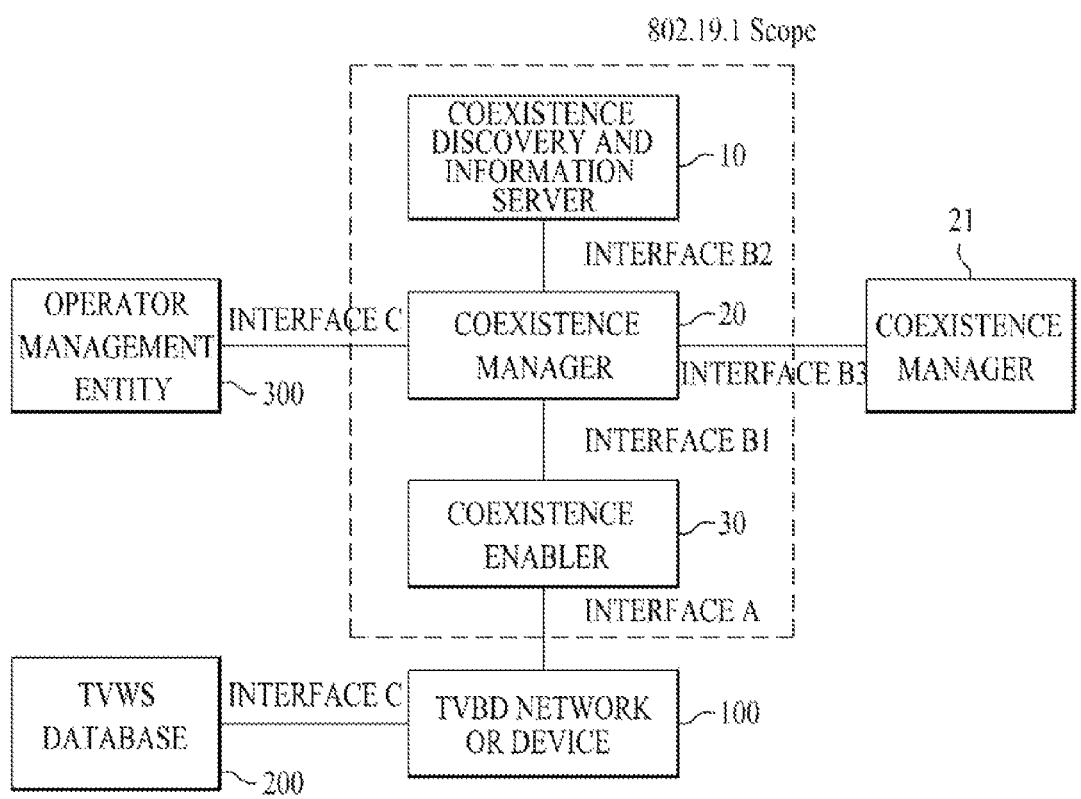
FIG. 1 is a block diagram illustrating a coexistence system according to an embodiment of the present invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

The terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the teachings of the present invention. As used herein, the term "and/or" includes any and all combinations of one or more of the associated listed items.

It will be understood that when an element, such as a layer, a region, or a substrate, is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present.

The terms used in the present specification are used for explaining a specific exemplary embodiment, not limiting the present inventive concept. Thus, the expression of singularity in the present specification includes the expression of plurality unless clearly specified otherwise in context. Also, the terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail by explaining exemplary embodiments of the invention with reference to the attached drawings. The same reference numerals in the drawings denote like elements, and a repeated explanation thereof will not be given.

In the description of the present invention, certain detailed explanations of related art are omitted when it is deemed that they may unnecessarily obscure the essence of the invention. The features of the present invention will be more clearly understood from the accompanying drawings and should not be limited by the accompanying drawings. It is to be appreciated that the spirit and technical scope of the present invention can encompass all changes, equivalents, and substitutes in addition to the attached drawings.

FIG. 1 is a block diagram illustrating a coexistence system according to an embodiment of the present invention.

In this specification, coexistence refers to the capability of two or more frequency (spectrum)-dependent devices or networks to operate without harmful interference. In addition, a coexistence service refers to a service provided to dissimilar or independently operated white space objects (WSOs) by a coexistence system and a service provided to other entities of the coexistence system by entities of the coexistence system. The WSO is an entity indicating a television white space (TVWS) devices, a television band device (TVBD), a network of TVWS devices, or a TVBD network and is connected to a coexistence enabler for consumption of coexistence services.

In this specification, the TVWS device and the TVBD or TVBD device are interchangeable, the TVWS network and the TVBD network are also interchangeable termed, and these terms may correspond to an entity referred to as a WSO.

As illustrated in FIG. 1, a structure of a coexistence system, that is, an 802.19 system includes three logical entities and six logic interfaces. Here, the logical entities may be installed or mounted on respective physical devices. Thus, the logical entities may be embodied as hardware using the devices on which the logical entities are installed or mounted. In order to clarify claims of the present invention, the logical entity may be termed an apparatus or device in this specification including the claims. For example, a coexistence manager (CM) 20 may be termed a "management apparatus" and a coexistence discovery and information server (CDIS) 10 may be simply termed a "server".

The three logical entities are each defined as the CM 20, a coexistence enabler (CE) 30, and a coexistence database (CD) or coexistence discovery and information server (CDIS) 10 according to function. The six logic interfaces are each defined as an interface A, an interface B1, an interface B2, an interface B3, an interface C, and an interface D according to whether the logic interface interfaces with another logical entity of 802.19.1.

Additionally, the 802.19 system is connected to external elements such as a TVWS database 200, a TVBD network or device 100, or an operator management entity (OME) 300.

Here, TV white space refers to a vacant frequency band that is not used by a broadcaster in VHF and UHF frequency bands that are distributed for TV broadcast and refers to an unlicensed band that can be used by any user when he or she satisfies conditions of radio wave regulations of the government. In detail, the TV white space refers to a vacant band for prevention of frequency interference between broadcasters and a frequency band that is not used for each region or an area to which radio waves for broadcast do not reach for each region from a spatial point of view, and refers to a vacant broadcast frequency in a time zone when a broadcaster does not broadcast at dawn from a temporal point of view.

A TV whitespace includes VHF bands 54 to 60, 76 to 88, and 174 to 216 MHz and UHF bands 470 to 698 MHz that are allocated to a broadcast TV system. In 512 to 608 MHz and 614 to 698 MHz, operations are allowed for all unlicensed devices except for in some particular cases, but bands 54 to 60 MHz, 76 to 88 MHz, 174 to 216 MHz, and 470 to 512 MHz, only communication between fixed devices is allowed. A fixed device is a device that performs transmission from a fixed location.

A TV white space device should not interfere with a TV viewer as a customer of a broadcaster, should not interrupt reception, and should not affect a wireless microphone device that communicates with low power using a portion of the band. In order satisfy this condition, the TV white space device requires the following technologies.

The TV white space device may require technologies such as a spectrum sensing technology for recognizing a TV channel being used to protect a broadcast channel, a access protocol technology for database having position-based TV channel information, a coexistence technology between heterogeneous devices using a TVWS band, an intelligent and autonomous wireless access element technology for a variable radio channel, a security technology for subscriber authentication for radio channel protection and protection of DBs and users, etc. The present invention will be described in terms of a coexistence technology between homogeneous or heterogeneous apparatuses (or devices) among these technologies.

The CM 20 and the CE 30 are logical entities defined for coexistence between different wireless service providers or wireless systems that operate in an unlicensed state in a TVWS. The CM 20 is an entity for resource allocation in order to overcome an issue associated with an interface between CEs 30 connected to the CM 20 while providing a guideline and policy associated with coexistence for coexistence between different service providers and systems operating in a TVWS.

The CE 30 may request and acquire information required for coexistence to and from the TVBD network or device 100, convert structure change requests/commands and control information received from the CM 20 into TVBD-specific structure change requests/commands, and transmit the TVBD-specific structure change requests/commands to the TVBD network or device 100. The TVBD network or device 100 refers to a user equipment for allowing use of a TV white space in the federal communication commission (FCC).

In order to overcome a coexistence issue between TVBD networks, the CM 20 may have a function of searching for other CMs, a coexistence decision making function of generating and providing control information and coexistence request/command corresponding to the CE 30, and a function of supporting information exchange required for coexistence between CMs (which may include hierarchical or peer-to-peer decision making when CMs are arranged).

The CM 20 may have a function of selecting a master CM by sharing information between various CMs, a function of generating a coexistence whitespace map having a distributed topology in order to effectively share frequency resources between different networks and systems, and a function of adjusting networks during management associated with TVWS coexistence.

The CM 20 may be embedded in a device such as an access point (AP) or may be installed out of the device. A fixed device such as an access point (AP) may have a function of the CM 20 and may select and manage a master CM for mastering a set including devices that are spatially separated, a service provider, or a specific system.

In this case, the master CM may be selected by the CD or CDIS 10 for allowing spatial reuse between spatially separated users. In this case, an interface map between CMs for resource allocation may be acquired as geo-location information or acquired by further using and processing neighbor information acquired from CMs. In the case of homogeneous networks, the master CM may be selected via communication between the networks, and in the case of heterogeneous networks, the master CM may be selected via negotiation via the CD or CDIS 10.

The CM 20 may have a hierarchical CM structure according to coverage or specific classification standard. With reference to a whitespace map (WM) acquired from the CD or CDIS 10, a procedure in which an uppermost-layer CM selects a resource in consideration of a lower layer of the uppermost-layer CM and a lower-layer CM selects a resource among the remaining resources in consideration a lower layer of the lower-layer CM.

In the case of a small size network with low coverage/power, the probability that a primary user is detected is relatively low and thus more available TVWS channels are present. Accordingly, a small size network compares a whitespace map (WM) of adjacent heterogeneous networks and a whitespace map (WM) of the small size network via the CM 20 and preferentially selects and uses a channel that cannot be used by adjacent networks, which can be adjusted by the CDIS 10 but can be distributively performed in a reverse order from the small size network.

The CD or CDIS 10 may have a function of generating a coexistence whitespace map having a centralized topology in order to effectively sharing a frequency resource between different networks and systems, a function of controlling a plurality of operators during management associated with TVWS coexistence, and a function of selecting a master CM in order to reduce communication overhead between CMs and to overcome the coexistence issue.

In addition, the CD or CDIS 10 may perform a function of calculating a coexistence contour in order to search for neighboring networks/systems, a function of redirecting a resource C-MAP according to a TVDB in order to the coexistence issue, a function of boosting opening of an interface between CMs to support search of CMs, and a function of collecting, synthesizing, and providing information for boosting of coexistence.

The CD 10 may omnipotently distribute resources for resource allocation, may suggest a criteria of priority between CMs and control resource selection of each CM as an intermediary, or may function as a medium for sharing information between external and heterogeneous networks between CMs as a DB.

The interface may be classified into three groups as illustrated in FIG. 1. The interface may classified into interface B1, an interface B2, and an interface B3 as an interface between 802.19.1 entities, an interface A as an interface between an 802.19.1 entity and a TVBD network/device, and an interface C and an interface D as an interface between an 802.19.1 entity and a TVWS database or an OME. The different interfaces in each group may be classified according to a using method thereof, a type of exchanged information, and underlying protocols.

The interface A may be an interface between the CE 30 and the TVBD network or device 100 and may be used to receive information required for coexistence, configuration/information request for coexistence, configuration/measurement/information response for coexistence, and other information as necessary from the TVBD network or device 100. Reconfiguration request/command and control information (corresponding to control information and coexistence request/command received from the CM), request/command associated with control of a measurement value, performed by the TVBD network or device 100, information indicating available resources, and other information as necessary from the CE 30 to the TVBD network or device 100.

The interface B1 may be an interface between the CE 30 and the CM 20 and may be used to provide information required for coexistence (information acquired from the TVBD network or device 100) and other information as necessary to the CM 20 from the CE 30. Coexistence request/command and control information and other information as necessary may be provided to the CE 30 from the CM 20.

The interface B2 may be an interface between the CM 20 and the CD or CDIS 10 and may be used to provide information required for a coexistence map, information required for a neighbor set, information required for registration/unenrollment, information required for searching (which is acquired by a currently used CM), information required for coexistence, and information as necessary to the CD or CDIS 10 from the CM 20.

Information indicated for a coexistence map, information indicated for a neighbor set, information indicated for a master CM, information required for search (which is acquired by another CM), information required for coexistence (which is acquired by another CM), and other information as necessary are provided to the CM 20 from the CD or CDIS 10.

The interface B3 may be an interface between the CM 20 and a CM 21 and may be used to provide information and messages for searching and coexistence, information indicated for registration/unregistration (to a master CM from a CM or to a server CM from a device CM), information indicated for coexistence (to a master CM from a CM or to a device CM from a server CM), and other information to the CM 21 from the CM 20.

The interface C may be an interface between the TVBD device 100 and the TVWS database 200 and may be used to provide information indicated for an available channel to the TVBD device 100 from the TVWS DB 200.

The interface D may be an interface between the CM 20 and the OME 300 and may be used to provide network operation information associated with information of the CM 20 (e.g., limiting factors associated with management of spectrum policy/network) and other information as necessary from the OME 300.

The coexistence system described with reference to FIG. 1 may have various topologies and may be largely classified into a centralized topology, a distributed topology, an autonomous topology. The present invention will be described in terms of a coexistence system having centralized and distributed topologies.

Figure 2:
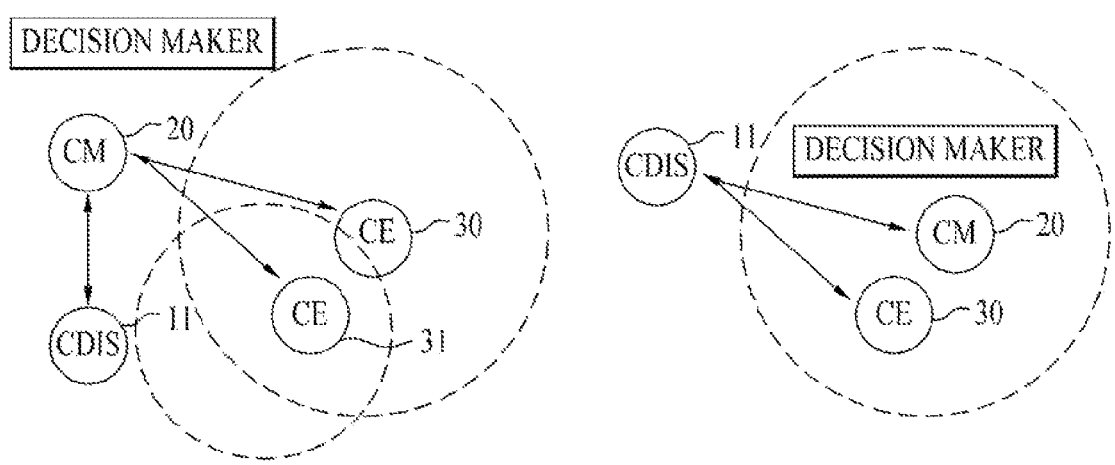
FIG. 2 is a diagram illustrating concept of a method for selecting a master coexistence manager (CM) in a coexistence system with a centralized topology according to an embodiment of the present invention.

FIG. 2 is a diagram illustrating concept of a method for selecting a master CM in a coexistence system with a centralized topology according to an embodiment of the present invention. As illustrated in FIG. 2, in the coexistence with a centralized topology, a CDIS 11 mainly stores and processes data and the CM 20 may function as a decision maker. In particular, the master CM 20 may control all networks or other UEs. In this case, one of TVBDs that interface with a network may be selected as the master CM 20.

Figure 3:
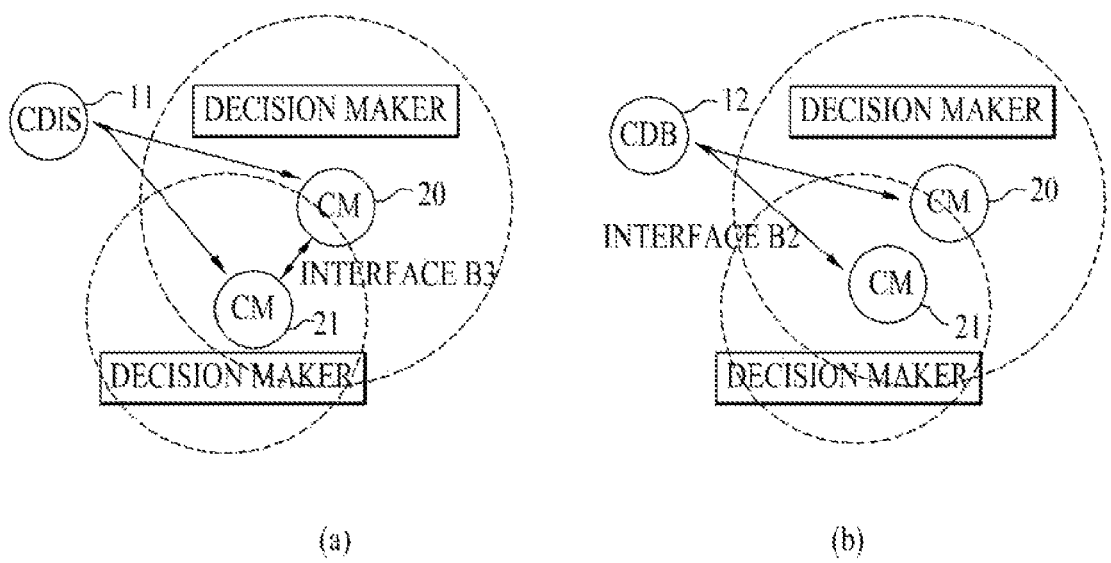
FIG. 3 is a diagram illustrating concept of a method for selecting a master CM in a coexistence system with a distributed topology according to an embodiment of the present invention.

FIG. 3 is a diagram illustrating concept of a method for selecting a master CM in a coexistence system with a distributed topology according to an embodiment of the present invention. As illustrated in FIG. 3, in the coexistence with a distributed topology, the CDIS 11 or a coexistence database (CDB) 12 may boost opening of interfaces between CMs, and the CM 20 may exchange information required for coexistence and perform hierarchical or peer-to-peer decision making.

The coexistence system of FIG. 3 may perform decision making via negotiation between CMs through an interface (the interface B3) to determine a master CM as illustrated in FIG. 3(*a*) or the CM 20 may request mediation to the CDIS 11 or a CDB 12 through an interface (the interface B2) to perform decision making or determine a master CM as illustrated in FIG. 3(*b*)

Figure 4:
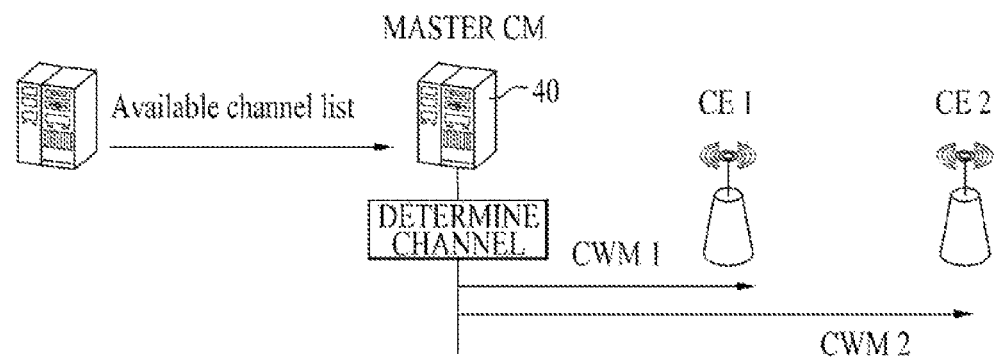
FIG. 4 is a diagram illustrating concept of comparison between operations of coexistence systems with a centralized topology and a distributed topology according to an embodiment of the present invention.
Figure 4:
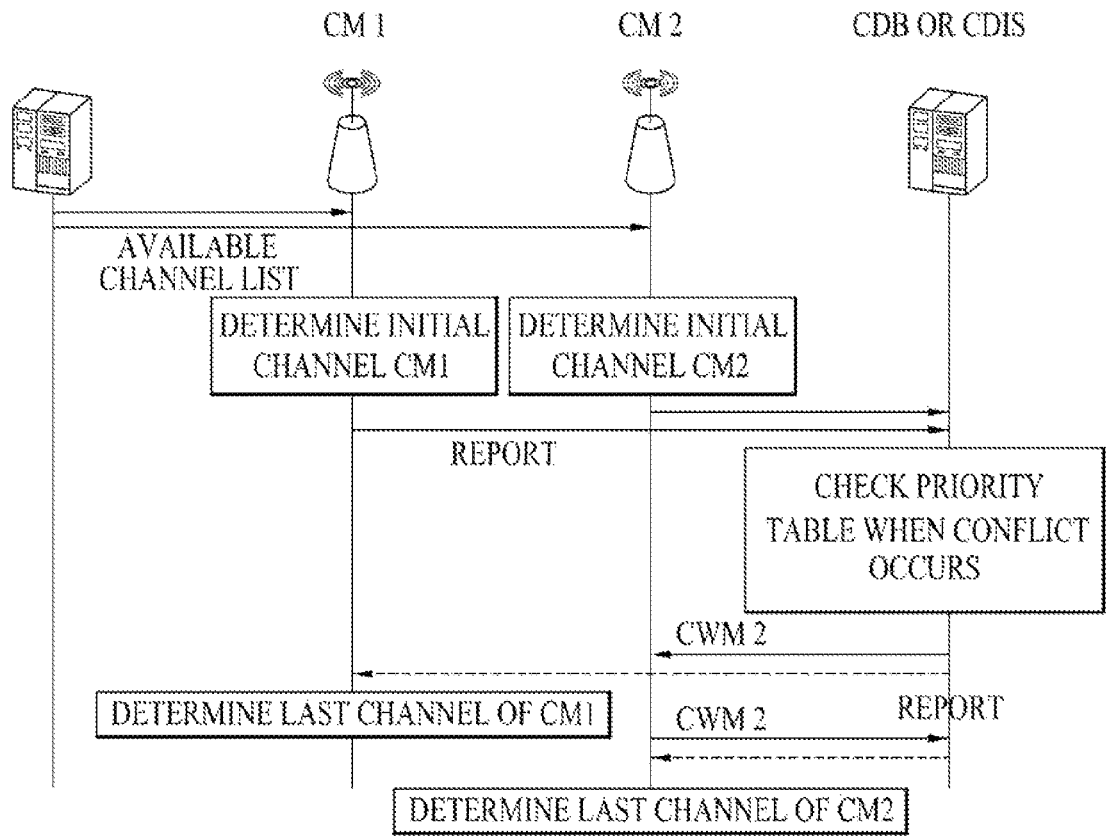

FIG. 4 is a diagram illustrating concept of comparison between operations of coexistence systems with a centralized topology and a distributed topology according to an embodiment of the present invention. As illustrated in FIG. 4(*a*), in the coexistence system with a centralized topology, a master (master or super) CM 40 may allocate independent channels to different CMs (or CEs), respectively. In this case, a coexistence whitespace map (CWM) may be used to indicate channels to be used.

As illustrated in FIG. 4(*b*), in the coexistence system with a distributed topology, CMs (e.g., a CM1 and a CM2) may be classified and given by priority according to predetermined based or standard. The CM 20 may report/send priority information about available channels to CDB/CDIS or other CMs. In this case, a CWM may be used as channels to be selected by CMs.

System requirements for decision making illustrated in FIG. 4 will now be described. An 802.19.1 system needs to analyze acquired information, to perform coexistence determination, and to support various topologies. Here, information may contain a bandwidth of each TVWS network or device, power limitation of each TVWS channel and an available channel list obtained from each TVWS network/device, and regulations, system parameters or pre-analyzed surrounding information, irrespective of a type of topology.

Figure 5:
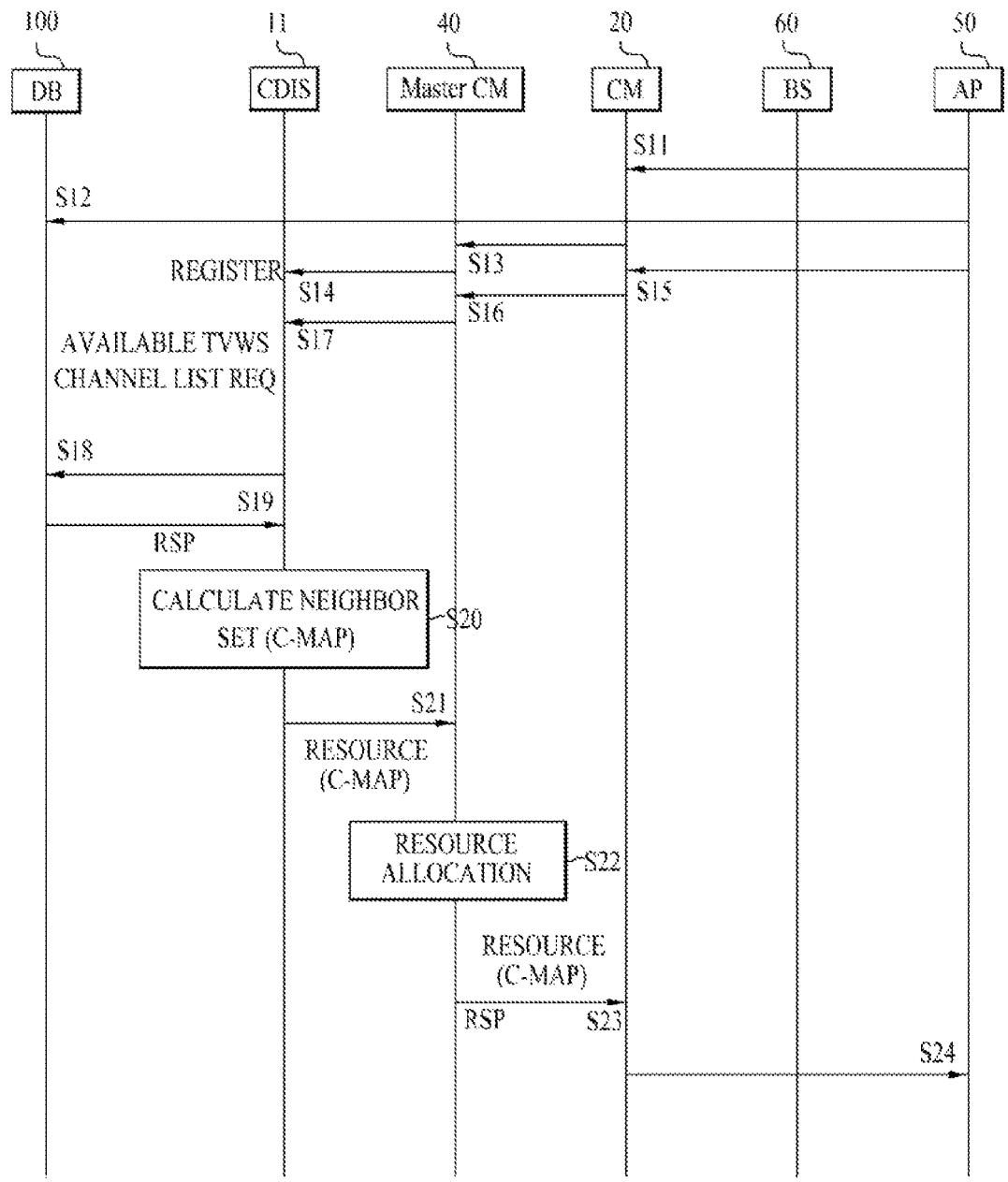
FIG. 5 is a signal flowchart illustrating a method for allocating a resource by a master CM in a coexistence system with a centralized topology according to an embodiment of the present invention.
Figure 6:
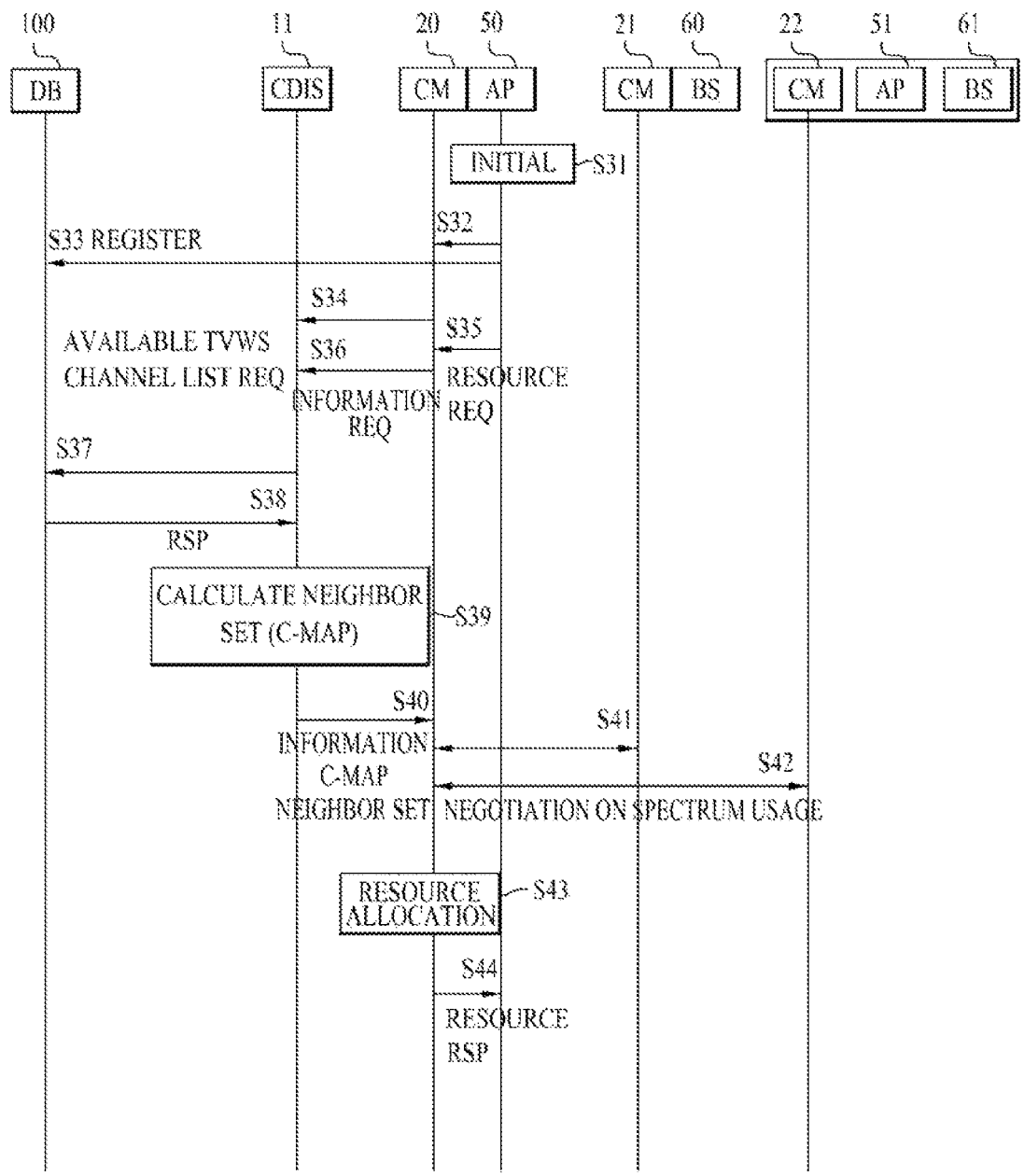
FIG. 6 is a signal flowchart illustrating a method for allocating a resource by a master CM in a coexistence system with a distributed topology according to an embodiment of the present invention.

FIGS. 5 and 6 are signal flowcharts of a method for allocating a resource by a master CM or a mater device in the coexistence systems with a centralized topology and a distributed topology described with reference to FIGS. 2 to 4.

FIG. 5 is a signal flowchart illustrating a method for allocating a resource by a master CM in a coexistence system with a centralized topology according to an embodiment of the present invention.

As illustrated in FIG. 5, the method for allocating a resource by the master CM 40 in one centralized topology may include steps S15 to S17 of requesting resources by an AP 50, steps S18 to S21 of acquiring an available channel list from the TVBD 100 by the CDIS 11 to indicate the available channel list to the master CM 40, and steps S22 to S24 of allocating a resource to the CM 20 by the master CM 40.

Hereinafter, a procedure of allocating a resource by a master CM by a centralized topology will be described in detail with reference to FIG. 5.

When an AP 50 is registered to the TVDB 100 and the CM 20 (S11 to S12), the CM 20 is registered to the master CM 40 (S13), and the master CM 40 is registered to the CDIS 11 (S14). When the AP 50 requests the CM 20 for a resource via resource request (Resource (C-MAP) REQ) (S15), the CM 20 requests the master CM 40 for a neighbor list and information about C-MAP (S16), and the master CM 40 requests the CDIS 11 for the neighbor list and the information about C-MAP (S17).

The CDIS 11 requests the TVDB 100 for an available TVWS channel list REQ, (S18), receives a response to the request from the TVDB 100 (S19), and calculates a neighbor or a neighbor set of the CM 20 and C-MAP (S20). The CDIS 11 may notify the master CM 40 of C-MAP and a neighbor list of the CM 20 as results obtained via the step S20 (S21). The master CM 40 allocates the resource (C-MAP) based on the notification to the CM 20 (S22 to S23), and the CM 20 notifies the AP 50 of the C-MAP (S24).

FIG. 6 is a signal flowchart illustrating a method for allocating a resource by a master CM in a coexistence system with a distributed topology according to an embodiment of the present invention.

As illustrated in FIG. 6, the method for allocating a resource by the master CM 20 in one distributed topology may include steps S35 to S37 of requesting resources by an AP 50, steps S37 to S40 of acquiring an available channel list from the TVBD 100 by the CDIS 11 to indicate the available channel list to the CM 20, and steps S41 and S42 of negotiating a resource with other CMs (e.g., the CM 21 and the CM 22) by the CM 20.

Hereinafter, a procedure of allocating a resource by the master CM 20 by a distributed topology will be described in detail with reference to FIG. 6.

When the AP 50 is registered to the TVDB 100 and the CM 20 (S31 to S33), the CM 20 is registered to the CDIS 11 (S34). When the AP 50 requests the CM 20 for a resource via resource request (Resource REQ) (S35), the CM 20 requests the CIDS 10 for neighbor list information and C-MAP (S36).

The CDIS 11 requests the TVDB 100 for an available TVWS channel list REQ (S37), receives a response to the request from the TVDB 100 (S38), and calculates a neighbor set of the CM 20 and C-MAP (S39). The CDIS 11 may notify the CM 20 of C-MAP and a neighbor list of CMs as results obtained via the step S39 (S40), and the CM 20 negotiates a resource with other CMs (e.g., the CM 21 and the CM 22) based on the notification (S41 to S42) and reallocates a resource C-MAP to the AP 50 (S43 to S44).

Figure 7:
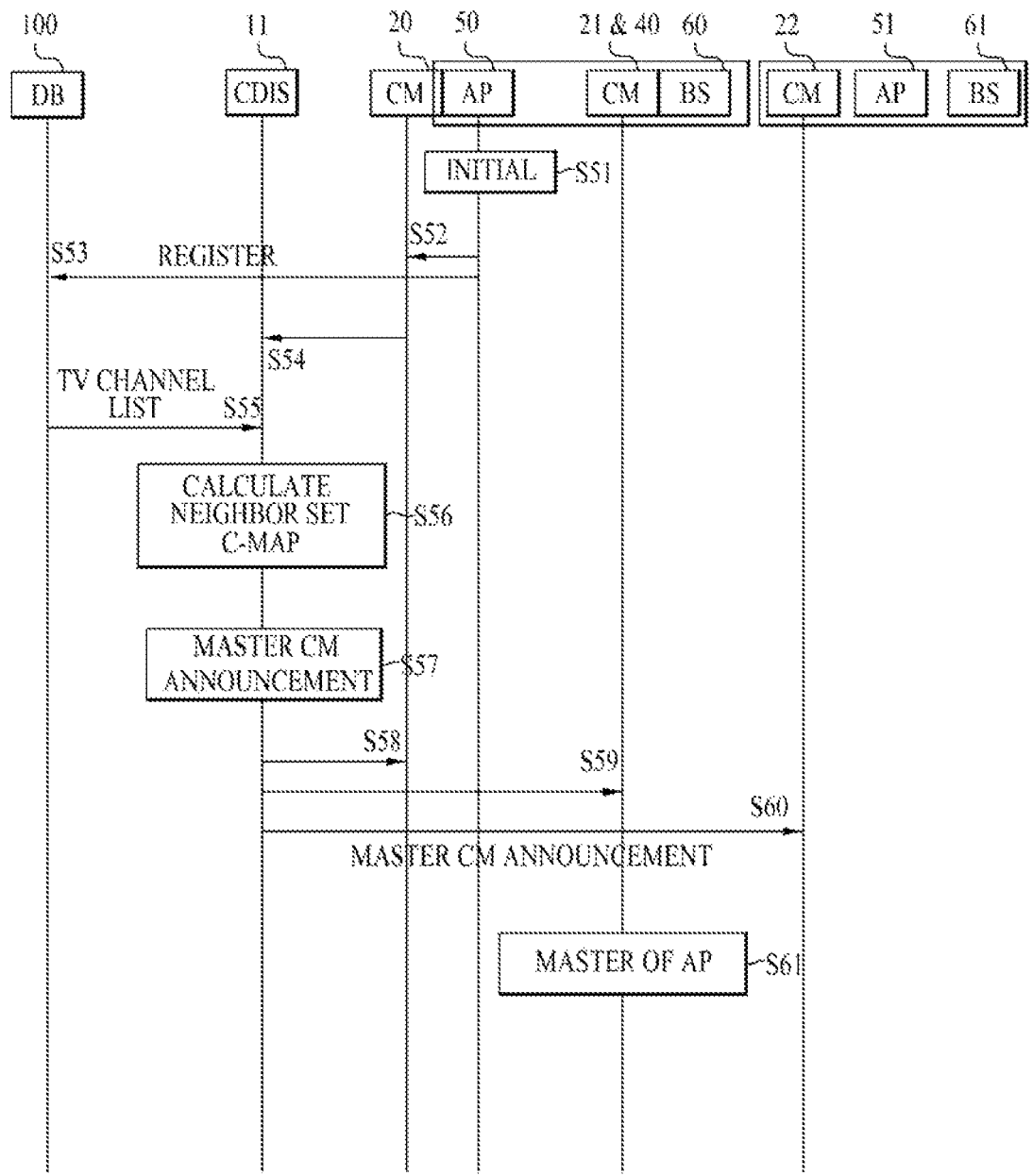
FIG. 7 is a signal flowchart illustrating a method for selecting a master CM in a coexistence system with a centralized topology according to an embodiment of the present invention.
Figure 8:
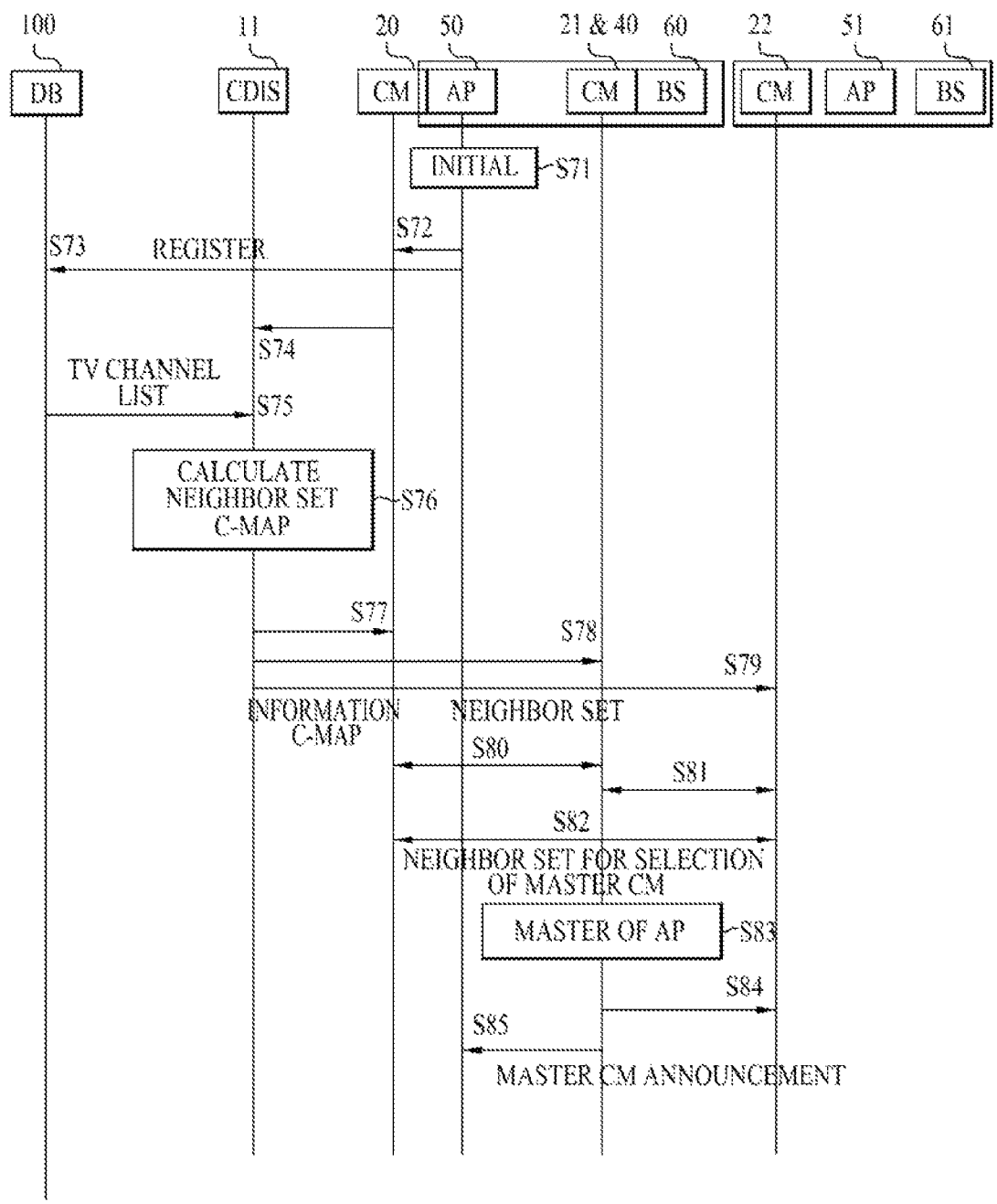
FIG. 8 is a signal flowchart illustrating a method for selecting a master CM in a coexistence system with a distributed topology according to an embodiment of the present invention.

FIGS. 7 and 8 are signal flowcharts illustrating a method for selecting a master CM (or a master device) in the coexistence systems with a centralized topology and a distributed topology described with reference to FIGS. 2 to 4.

FIG. 7 is a signal flowchart illustrating a method for selecting the master CM in a coexistence system with a centralized topology according to an embodiment of the present invention.

As illustrated in FIG. 7, the method for selecting the master CM by a centralized topology includes a step S55 of receiving TV channel lists from the TVDB 100 by the CDIS 11, steps S56 and S57 of calculating C-MAP and a neighbor of CMs by the CDIS 11 to select the master CM of CMs, and steps S58 to S60 of notifying the other CMs (the CM 20 and the CM 22) of the selection of the master CM by the CDIS 11.

Hereinafter, a procedure of selecting the master CM in a centralized topology will be described in detail with reference to FIG. 7.

When the AP 50 is registered to the TVDB 100 and the CM 20 (S51 to S53), the CM 20 is registered to the CDIS 11 (S54). The CDIS 11 acquires information of an available TV channel list from the TVDB 100 (S55). Here, the TVDB 100 updates the available TV channel list at a regular interval. The CDIS 11 calculates C-MAP and a neighbor or neighbor set of CMs (e.g., the CM 20 and the CM 22) (S56) to select the CM 21 as the master CM (S57), and then notifies CMs of the selection of the master CM (S58 to S60). The CM 21 that is finally selected is a master of an AP (S61).

FIG. 8 is a signal flowchart illustrating a method for selecting the master CM in a coexistence system with a distributed topology according to an embodiment of the present invention.

As illustrated in FIG. 8, the method for selecting the master CM by a distributed topology includes a step S75 of receiving channel lists from the TVDB 100 by the CDIS 11, steps S76 to S79 of calculating C-MAP and a neighbor of CMs by the CDIS 11 and notifying CMs of the calculation result, and steps S80 to S82 of performing negotiation between CMs in order to select the master CM or a master device by each of the CMs.

Hereinafter a procedure of selecting the master CM in a distributed topology will be described in detail with reference to FIG. 8.

When the AP 50 is registered to the TVDB 100 and the CM 20 (S71 to S73), the CM 20 is registered to the CDIS 11 (S74). The CDIS 11 acquires information of an available TV channel list from the TVDB 100 (S75). Here, the TVDB 100 updates the available TV channel list at a regular interval. The CDIS 11 calculates −MAP and a neighbor or neighbor set of CMs (S76) and notifies CMs of neighbor lists of the CMs (S77 to S79). The CMs negotiates a resource between the CMs to select a master CM (S80 to S82), and the selected master CM 21 is a master of an AP (S83). The selected master CM 21 notifies the CM of this fact (S84 and S85).

Figure 9:
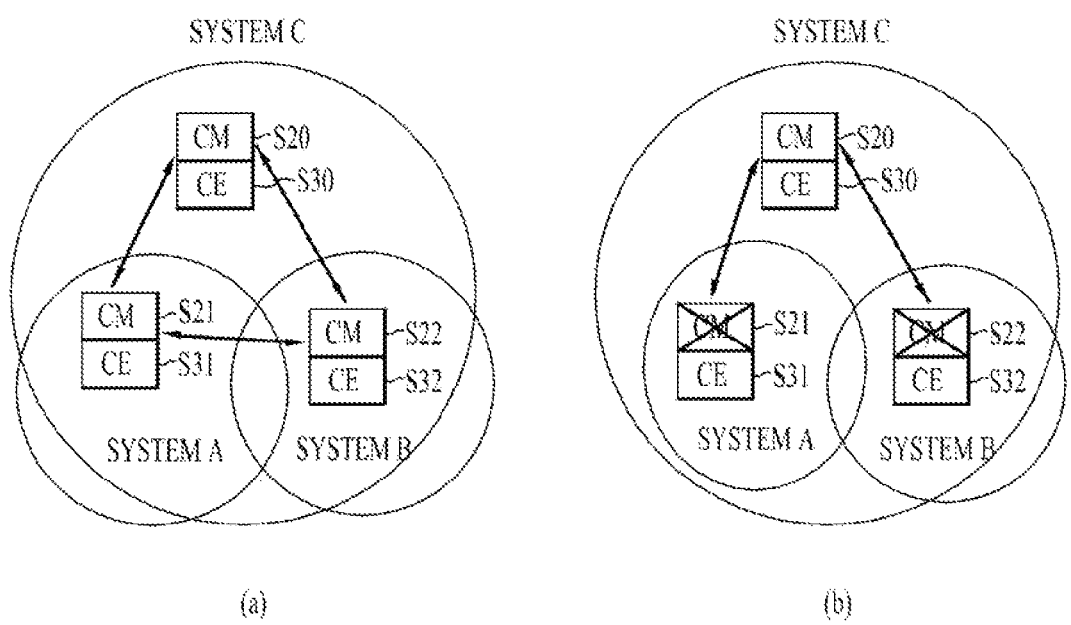
FIG. 9 is a diagram illustrating an example in which various structures can be adaptively supported via enable/disable between heterogeneous CMs in a coexistence system according to an embodiment of the present invention.
Figure 10:
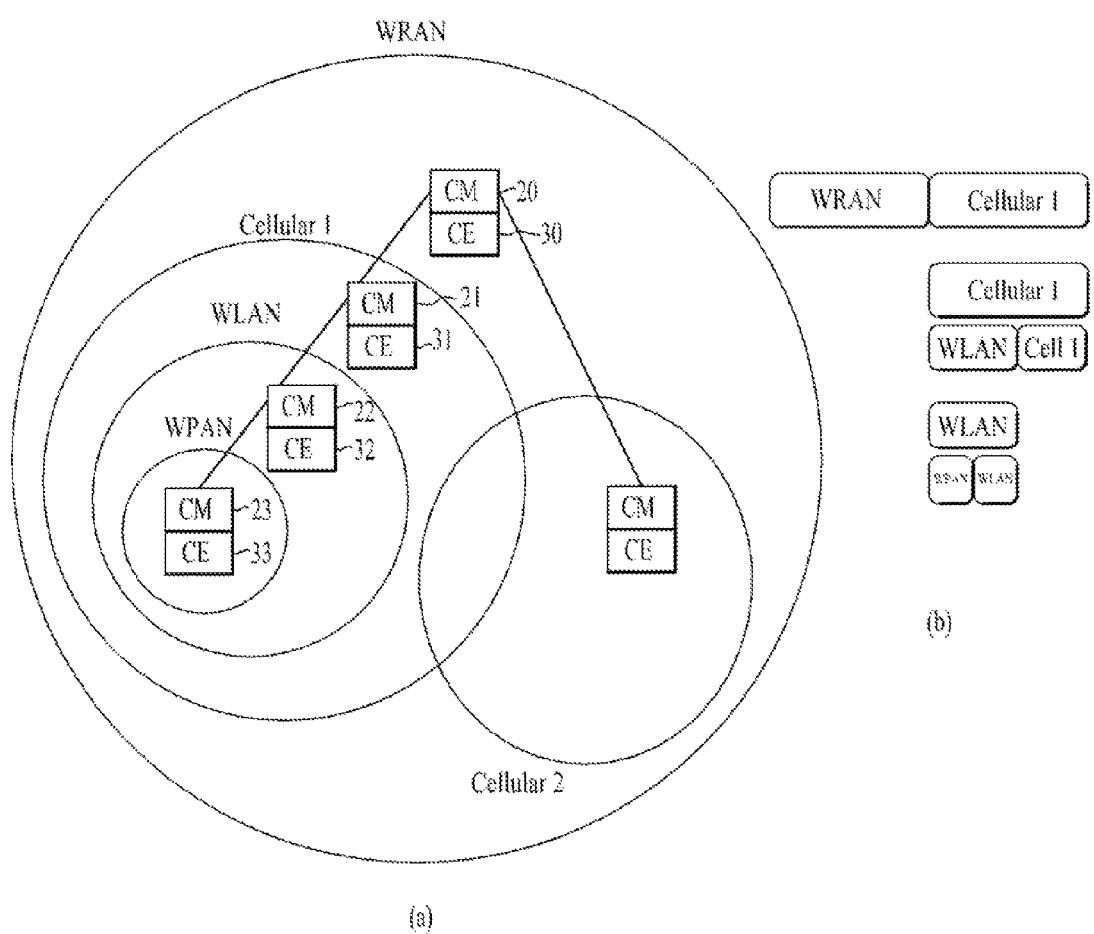
FIG. 10 is a diagram illustrating an example in which a hierarchical structure is formed and operated via enable/disable between heterogeneous CMs in a coexistence system according to an embodiment of the present invention.

As seen from FIGS. 9 and 10, in a network in which homogeneous systems can coexist without cooperation, a master CM or a master device (BS, eNodeB, MS, etc.) is selected, and a network or device (or CM/CE of a device) that is not a mater CM or a mater device is controlled to be ON/OFF or disabled so as to adaptively support various types of structures.

FIG. 9 is a diagram illustrating an example in which various structures can be adaptively supported via enable/disable between heterogeneous CMs in a coexistence system according to an embodiment of the present invention.

As illustrated in FIG. 9, CMs of a heterogeneous system that requires cooperation may adaptively support various types of structures ON/OFF, active/inactive, enable/disable, or the like between the CMs. As illustrated in FIG. 9(*a*), when a structure between CMs of each heterogeneous system (e.g., a system A, a system B, and a system C) is formed as a peer-to-peer structure, it may be seen that an enabled CM 20 is operated as a controller of the disable CM 21 and CM 22 to form a tree structure via enable/disable, etc. between CMs, as illustrated in FIG. 9(*b*).

FIG. 10 is a diagram illustrating an example in which a hierarchical structure is formed and operated via enable/disable between heterogeneous CMs in a coexistence system according to an embodiment of the present invention. As seen from FIG. 10(*a*), a master CM may be selected via ON/OFF, active/inactive, enable/disable, or the like between the heterogeneous CMs to form a vertical relation, and each CM may perform decision making on networks of a horizontal layer and a lower layer of the CM.

For example, as illustrated in FIG. 10(*b*), a cellular system may determine resource regions of the cellular system and a WLAN as a lower layer of the cellular system, and the WLAN may determine resource regions of the WLAN and a WPAN as a lower layer of the WLAN with respect to resources allocated from the cellular system.

TABLE 1

| Information Element | Data Type | Description/Value |
|---|---|---|
| MsgType | Char | Message type |
| sourceType | CX_ID | Source type |
| sourceIdentifier | IA5String | Source identifier |
| destType | CX_ID | Destination type |
| destinationIdentifier | IA5String | Destination identifier |
| ACKPolicy | Boolean | Request to send an acknowledgement of reception by setting this field to 1 |
| Length | Integer | The total length of payload |

MsgType field has a length of 1 Octet. The MsgType field represents a message type of corresponding message. A value of the MsgType field is listed in Table 2 below. SourceType and destType field represent a type of transmitter and receiver, respectively. SourceIdentifier and destinationIdentifier represent an identifier of transmitter and receiver, respectively. Length field represents a total length of corresponding message payload. ACKPolicy field a field for requesting a receiver of the corresponding message (that is, an entity identified by the destinationIdentifier) to transmit acknowledgement of receipt, if the ACKPolicy field is set to 1, the request is activated.

Table 2 below represents the MsgType.

TABLE 2

| Value | MsgType | Description |
|---|---|---|
| 0 | ACK | |
| 1 | Authentication_Request | |
| 2 | Authentication_Response | |
| 3 | Deauthentication_Request | |
| 4 | Deauthentication_Response | |
| 5 | StopOperation_Announcement | |
| 6 | StopOperation_Confirm | |
| 7 | Subscription_Request | |
| 8 | Subscription_Response | |
| 9 | SubscriptionChange_Request | |
| 10 | SubscriptionChange_Response | |
| 11 | CE_Registration_Request | |
| 12 | CE_Registratioin_Response | |
| 13 | CM_Registration_Request | |
| 14 | CM_Registration_Response | |
| 15 | NeighborList_Request | |
| 16 | NeighborList_Response | |
| 17 | NeighborList_Announcement | |
| 18 | NeighborReport_Announcement | |
| 19 | AvailableChannels_Request | |
| 20 | AvailableChannels_Response | |
| 21 | AvailableChannels_Announcement | |
| 22 | CM_AvailableChannels_Request | |
| 23 | CM_ChannelClassification_Request | |
| 24 | CM_ChannelClassification_Response | |
| 25 | ChannelClassification_Request | |
| 26 | ChannelClassification_Response | |
| 27 | ChannelClassification_Announcement | |
| 28 | InfoAcquiring_Request | |
| 29 | InfoAcquiring_Response | |
| 30 | NeighborInformation_Announcement | |
| 31 | NeighborInformation_Confirm | |
| 32 | Measurement_Request | |
| 33 | Measurement_Confirm | |
| 34 | Measurement_Response | |
| 35 | Negotiation_Request | |
| 36 | Negotiation_Announcement | |
| 37 | CM_MasterCM_Request | |
| 38 | CM_MasterCM_Confirm | |
| 39 | CDIS_MasterCM_Request | |
| 40 | CDIS_MasterCM_Confirm | |
| 41 | MasterCM_Request | |
| 42 | MasterCM_Confirm | |
| 43 | MasterCM_Indication | |
| 44 | MasterSlaveCMConfiguration_Request | |
| 45 | MasterSlaveCMConfiguration_Announcement | |
| 46 | CM_MasterSlaveCMConfiguration_Request | |
| 47 | CM_MasterSlaveCMConfiguration_Response | |
| 48 | CM_MasterSlaveCMConfiguration_Confirm | |
| 49 | Reconfiguration_Request | |
| 50 | Reconfiguration_Response | |
| 51 | CM_Reconfiguration_Request | |
| 52 | CM_Reconfiguration_Response | |
| 53 | ResourceReconfiguration_Request | |
| 54 | ResourceReconfiguration_Response | |
| 55 | Event_Indication | |
| 56 | Event_Confirm | |
| 57-255 | Reserved (to be filled later) | |

Figure 11:
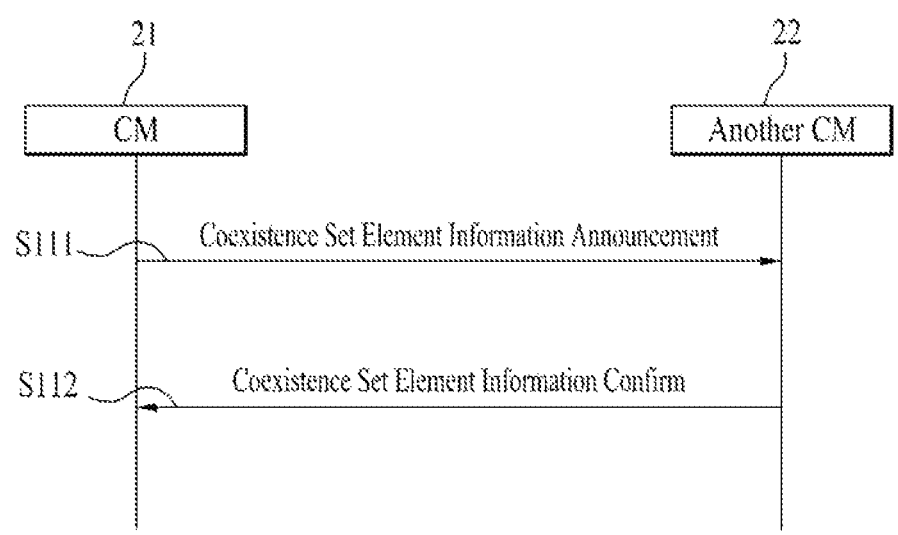
FIG. 11 illustrates a coexistence set information sharing procedure according to an embodiment of the present invention.

FIG. 11 illustrates a coexistence set information sharing procedure according to an embodiment of the present invention. A CM (a management device) may perform the coexistence set information sharing procedure when coexistence set information for one or more WSOs having coexistence set WSOs served by the CM and served by other one or more CMs is changed.

After coexistence set information for one or more WSOs having coexistence set WSOs served by a CM 21 and served by other one or more CMs is changed, the CM 21 may generate one or more coexistence set information announcement messages, for example, a CoexistenceSetElementInformationAnnouncement message. The number of the generated messages is equal to the number of CMs that serve WOSs in a coexistence set of WSOs, coexistence set information of which is changed.

The CM 21 may transmit the generated coexistence set information announcement message to CMs that serve WOSs in a coexistence set of WSOs, coexistence set information is changed (S111). Other CMs 22 that receive the coexistence set information announcement message may generate a coexistence set information confirmation message, for example, a CoexistenceSetElementInformationConfirm message and transmit the message to the CM 21 in response to the coexistence set information announcement message.

The CoexistenceSetElementInformationAnnouncement message may include information about a geo-location of the CM 21 and a coverage radius of the CM 21. Accordingly, the CM 21 may acquire information about geo-locations and coverage radii of the other CMs 22 via the above coexistence set information sharing procedure.

Figure 12:
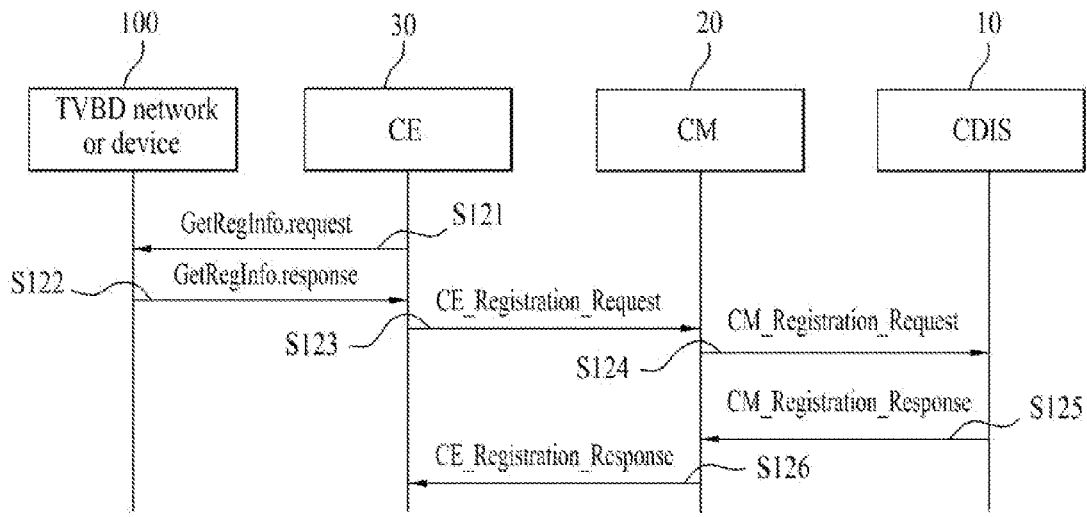
FIG. 12 is a flowchart of a registration procedure according to an embodiment of the present invention.
Figure 12:
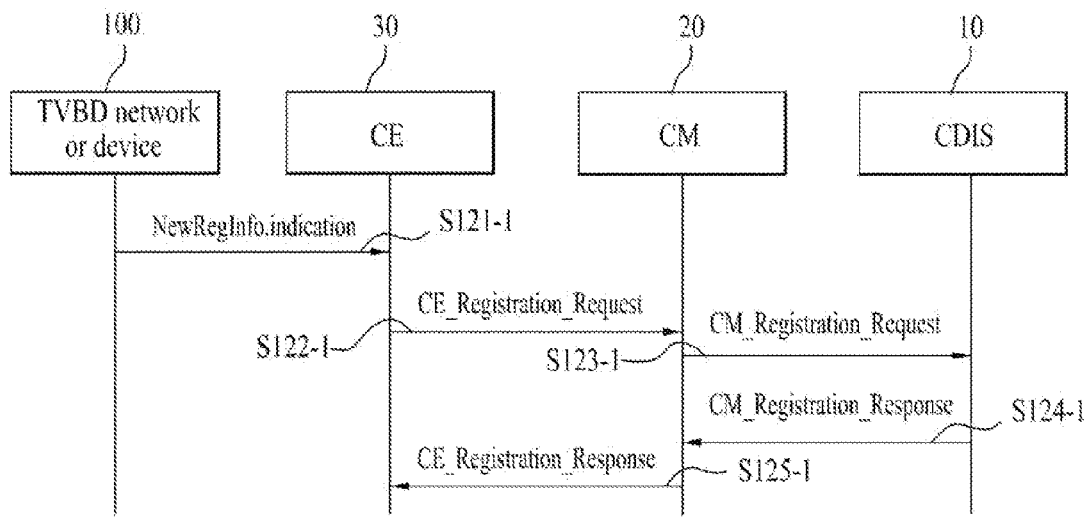

FIG. 12 is a flowchart of a registration procedure according to an embodiment of the present invention.

FIG. 12(*a*) illustrates a WSO registration procedure. Upon successfully completing a WSO subscription procedure, a CE 30 may perform the WSO registration procedure. After successfully completing the WSO subscription procedure, the CE 30 may acquire WSO registration information. After acquiring the WSO registration information, the CE 30 may generate a request message for CE registration, for example, a CE_Registration_Request message and transmit the request message to a CM 20 that serves the CE 30.

In more detail, after successfully completing the WSO subscription procedure, the CE 30 may transmit a registration information request message for requesting to provide registration information, for example, a GetRegInfo.request message to a WSO 100 (S121). In response to the GetRegInfo.request message, the WSO 100 may transmit a registration information response message, for example, a GetReginfo.response message to the CE 30 (S122) and the registration information response message may include the requested registration information. Upon receiving the registration information response message, the CE 30 may transmit a request message for registration or update registration of the registration information for WSO, for example, a CE_Registration_Request message to the CM 20 (S123). In the present disclosure, registration or update registration of the registration information is referred to as "registration." Also, the CE_Registration_Request message may include an ID or a serial number (SN) of the WSO (or TVWS device).

The CE 30 may wait for a CE registration response message, for example, a CE_Registration_Response message from a CM 40. In this case, when the CE 30 does not receive the response message within a predetermined period of time, the CE 30 may re-transmit the request message to the CM 20.

Then in order to perform WSO registration and to register or update registration information of the WSO to a CDIS 10, the CM 20 may transmit a CM registration request message, for example, a CM_Registration_Request message to the CDIS 10 (S124). The CM registration request message may include information about the maximum number of WSOs that can be controlled by the CM, a geo-location and coverage radius of the CM and may further include more information. The CM registration request message may include information indicating whether the registration is a new registration, an update registration or deletion of WSO, an identifier of CE which the CM registration request message is applied to, a network ID, network technology, and network type. The CM registration request message may includes other information. In addition, the CM 20 may wait for a CM registration response message corresponding to the CM registration request message from the CDIS 10. In this case, when the CM 20 does not receive the response message within a predetermined period of time, the CM 20 may re-transmit the CM registration request message to the CDIS 10.

Moreover, since the CM 20 can know the number of WSO registered to itself, the CM 20 may compares the number of WSO currently registered to itself with the maximum number of WSOs that can be controlled by the CM 20, and may not transmit the CM registration request message to the CDIS 10 according to a result of the comparison. That is, if the number of WSO currently registered to the CM 20 is equal to or greater than the maximum number of WSOs that can be controlled by the CM 20, the CM 20 may not transmit the CM registration request message to the CDIS 10.

Upon receiving the CE registration request message, the CM 20 may determine that the CM 20 itself can perform the registration or the update registration. According to a result of the determination, transmission of the CM registration request message to the CDIS 10 is not occurred, unnecessary signaling is reduced.

Upon receiving the CM registration request message, the CDIS 10 may perform the CM registration and transmit a CM registration response message, for example, a CM_Registration_Response message to the CM 20 (S125).

The CM registration request message is transmitted to confirm the registration of the CE (or WSO) from the CDIS 10 to the CM 20, and as described in connection with Table 1, the sourceIdentifier may be set to the ID of the CDIS 10 and the destinationIdentifier may be set to the ID of the CM 20. The CM registration response message may have structure as follows:

TABLE 3

| Information element | Data type | Description |
| --- | --- | --- |
| CEID | CX_ID | CE ID |
| Status | Boolean | Status: successful or not |
| Reason | Char | Reason when Status is not successful<br>0: CDIS Registration is full.<br>1: Registration request information is wrong.<br>2-255 Reserved |

The CEID field corresponds to an ID of transmitter of the CE registration request message, that is, the CE 30 which requested the CE registration. The status field represents a result of processing of the CM registration request message. The reason field represents a reason in case of the status field indicating not success. If the reason field is set to '0,' it indicates that the capacity for registering the CDIS 10 is full; if the reason field is set to '1,' it indicates that information included in the CM registration request message is wrong.

The CM registration response message is a response to the CM registration request message (S124), it transmitted from the CDIS 10 to the CM 20, however, since the CE as well as the CM is the requestor of the registration, a result for the CE requested registration needs to be informed. Thus, the CM registration response message is generated and transmitted as many as the number of the CM registration request messages. In addition, since the CM registration request message is generated and transmitted in response to the CE registration request message, the CM registration request message is generated and transmitted as many as the number of the CE registration request messages. That is, the CM registration response message (S125) generated in response to such request messages should be generated and transmitted to the CM 20 as many as the number of request messages. However, the CEID field included in the CM registration response message allows the CM registration response message to be generated out of proportion with the number of the registration request messages. In other words, the CEID field allows only one CM registration response message to be used for responding to the CM 20.

For example, when the CM registration request message is transmitted to the CDIS 10 in response to the CE registration request messages from ten (10) CEs, the CEID field included in the CM registration response message is set to ID(s) of CE(s) which succeed in registering. In this regard, the status field included in the CM registration response message is set to 'success.' The CM registration response message including the CEID field may be transmitted to the CEs set in the CEID field among the ten CEs.

Thus, if the registration of CEs which transmitted the registration request messages is 'success', only one CM registration response message may be generated and utilized instead of generating CM registration response messages for respective one of the CEs.

In the above example, since the CM registration response message is for CMs or CEs of which the registration is 'success,' in case the registration is not 'success' (that is, 'failure'), a separate CM registration response message may be needed. In this case, the CEID field included in the CM registration response message may be set to ID(s) of CE(s) of which the registration is not success among ten (10) request messages. In this regard, the status field included in the CM registration response message may be set to 'not success.' However, since the failure of the registration is due to different reasons, the reason field included in the CM registration response message should be set to one another, at least two CM registration response messages are needed to be generated. However, in case that the registration is 'failure,' a CM registration response message may be utilized for CEs having identical reason for failure of the registration, the number of messages to be generated may be reduced.

To summary, by using the CEID field included in the CM registration response message, if at least a result (or statue) of the registration is identical, or if the registration is failed for two or more registration request messages with identical reason, a response to the registration may be transmitted for at least one CE via one CM registration response message.

After the CM 20 receives the CM registration response message and checks each field included therein, the CM 20 may perform the registration for WSO requested by the CEs for which the registration or the update registration is successfully performed.

The CM 20 may transmit a registration response message for reception confirmation response to a request message for CE registration from the CE, for example, a CE_Registration_Response message to the CE 30 (S126).

The CE registration response message has following structure.

TABLE 4

| Information element | Data type | Description |
| --- | --- | --- |
| Status | Boolean | Status: successful or not |
| Reason | Char | Reason when Status is not successful<br>0: CM Registration is full.<br>1: CDIS Registration is full.<br>2: Registration request information is wrong.<br>3-255: Reserved |

The status field represents a result of processing the CE registration request message. The reason field represents a reason of the status when the status is not success. If the reason filed is set to '0,' it indicates that capacity for registration of the CM 20 is full; if the reason filed is set to '1,' it indicates that capacity for registration of the CDIS 10 is full; if the reason filed is set to '2,' it indicates that information included in the CE registration request message is wrong. The CE registration response message does not need a field representing an identifier in contrast with the CM registration response message, and this is because the CE registration response message is transmitted from the CM 20 to one CE 10 so that a target entity of the CE registration response message is not needed to indicate.

An order of S123 to S126 of the operations described with reference to FIG. 12(a) may be changed according to embodiments of the present invention. In particular, although FIG. 12(a) illustrates the case in which the CE registration response message is transmitted to the CE 30 from the CM 20 after the CM registration response message is transmitted to the CM 20 from the CDIS 10, the CE registration response message may be transmitted to the CE 30 from the CM 20 at any time after the CE registration request message is transmitted to the CM 20 from the CE 30.

FIG. 12(b) is similar to FIG. 12(a) except for some points. In more detail, FIG. 12(b) illustrates a WSO registration update procedure and thus is different from FIG. 12(a) in terms of only a step S121-1. Steps S122-1 to S125-1 of FIG. 12(b) are the same or similar to the above steps S123 to S126 and thus their repeated description will be omitted herein.

The WSO 100 may transmit a new registration information announcement message, that is, a NewRegInfo indication message to the CE 30 (S121-1). This process is performed to update registration information of the WSO 100 to a coexistence system by the WSO 100. Upon receiving new registration information of the WSO, the CE 30 may perform the WSO registration procedure. Subsequent steps S122-1 to S125-1 are the same as S123 to S126 of FIG. 12(a) and thus their description will be omitted herein.

One CM may be selected as a master CM for coexistence among a plurality of CMs in a TVBD network for coexistence. The master CM may perform decision making of channel selection for a registered or connected WSO to remaining CMs (i.e. slave CMs) as well as the master CM. A decision making scheme or topology for coexistence includes an autonomous topology, a distributed topology, and a centralized topology. In the autonomous topology, a CM performs decision making for coexistence independently of other CMs. In the distributed topology, a CM negotiates on decision making with other CMs that serve neighboring WSOs. In the centralized topology, one CM, that is, a master CM controls decision making for other CMs, that is, slave CMs. A CM can change decision making topology at any time.

Accordingly, based on the aforementioned advantages and disadvantages, the decision making topology is changed or switched. For example, when the decision making topology is changed to the centralized topology from the distributed topology or when a preselected master CM cannot function as a master CM any more while maintaining the centralized topology, a master CM needs to be selected. A trigger condition of a master CM selection process will be described with regard to the following embodiments of the present invention.

A request for selection of the master CM may be initiated according to a specific condition. When the specific condition is not defined and it is assumed that all CMs or CDISs belonging to the same network can arbitrarily perform a master CM selection request, an efficiency of master CM selection for management of a coexistence service may be degraded.

The master CM selection process is configured for autonomous re-configuration of CMs. Other advantages of the master CM selection process may be based on (1) load balance between CMs and (2) reduction in communication overhead between CMs.

An embodiment of the present invention proposes several trigger conditions for the master CM selection request. When the trigger condition is satisfied, re-configuration of a CM selection procedure or process, that is, coexistence topology may be initiated by a CM or a CDIS. That is, as the trigger condition is satisfied, the master CM selection process may be triggered.

The master CM selection process may be based on a load balance parameter. In more detail, the load balance parameter may include two values, a first parameter and a second parameter, and the master CM selection process may be triggered by a CM or a CDIS based on the load balance parameter. The first parameter is the number of TVBD devices that are being controlled by a CM, N(t), and the second parameter is the maximum number of TVBD devices that can be controlled by the CM, $N_{max}$. In more detail, a trigger condition according to Expression 1 below is proposed.

$$\frac{N_A(t)}{N_A^{max}} + M_{trigger} \geq 1$$

Expression 1

In Expression 1 above, $N_A(t)$ is the number of TVBD devices that are being controlled by a management device A, $N_A^{max}$ is the maximum number of TVBD devices that can be controlled by the management device A, and $M_{trigger}$ corresponds to a margin value for the trigger condition.

Expression 1 above will now be described in more detail. A ratio of $N_A(t)$ and $N_A^{max}$ denotes a current load factor of $CM_A$. Accordingly, when the ratio is 1, this means that the $CM_A$ controls a maximum number of TVDB devices that can be controlled by the $CM_A$ and thus maximum load is applied to the $CM_A$. Accordingly, $M_{trigger}$ is introduced in order to initiate (or request) selection of a master CM before the ratio becomes 1. Likewise, when an excessive loaded CM exists, the master CM selection process is initiated, and thus, the trigger condition may balance load for CMs in a TVBD network or CMs managed by one CDIS.

CMs that satisfy the trigger condition may be determined as candidate slave CMs and other CMs, that is, CMs that do not satisfy the trigger condition may be determined as candidate master CMs. The candidate slave CMs or a CDIS to which the candidate slave CMs are registered may initiate a master CM selection process in order to continuously perform executed coexistence services.

In addition, the master CM selection process may be triggered by a CM or a CDIS in consideration of geo-coverage of each CM. That is, the master CM selection process may be based on a geo-coverage parameter. The geo-coverage parameter may include a geo-location parameter and geo-coverage parameter of a CM. The geo-coverage parameter may further include time. The geo-coverage parameter may be used to reduce communication overhead between CMs. The geo-coverage parameter may be acquired by a pair of CMs. In detail, a trigger condition based on the geo-coverage parameter is represented according to Expression 2 below.

$$C_A(pos,r,t) \subset C_B(pos,r,t)$$

Expression 2

In Expression 2 above, pos denotes a geo-location of a CM, r denotes a coverage radius of a CM, and t denotes time. Accordingly, $C_A$(pos, r, t) denotes geo-coverage of $CM_A$ at time=t and $C_B$(pos, r, t) denotes geo-coverage of $CM_B$ at time=t.

Accordingly, the trigger condition according to Expression 2 above is used to determine whether geo-coverage of $CM_A$ belongs to geo-coverage of $CM_B$. In this case, when the geo-coverage of $CM_A$ belongs to the geo-coverage of $CM_B$, the trigger condition is satisfied.

When the trigger condition according to Expression 2 above is satisfied, a master CM selection process may be initiated in order to continuously perform coexistence services performed by both $CM_A$ and $CM_B$ with lower network overhead. In addition, when the trigger condition is satisfied at specific timing, a CDIS that monitors registered CMs may also initiate the master CM selection process.

When the process is initiated, a CDIS may perform final decision masking for a master CM selection process of a pair of a master CM and a slave CM based on an internal decision standard. An example of the decision standard of a CDIS is represented according to Expression 3 below.

$$N_B^{max} > N_A(t) + N_B(t) + M_{criteria\perp}$$ Expression 3

In Expression 3, $N_A(t)$ is the number of TVBD devices that are being controlled by a management device A, $N_B(t)$ is the number of TVBD devices that are being controlled by a management device B, $N_B^{max}$ is the maximum number of TVBD devices that can be controlled by the management device B, and $M_{criteria}$ corresponds to a margin value for the decision standard. The standard is used to check whether the management device B as a candidate master CM can handle the management device A as a slave CM of the management device B at specific timing. When the decision is satisfied, the management device B may be determined as a candidate master management device.

The trigger conditions for the aforementioned master management device selection process are merely an example and thus do not limit the scope of the present invention. A CDIS may perform decision making using information parameters of a registration procedure.

When a CM is a slave CM, the master CM may perform a coexistence decision making process on devices or TVBD networks registered to the slave CM. A result of the coexistence decision making process may be forwarded to a slave CM that will distribute resources to devices or TVBD networks connected to the master CM.

In addition, a master CM may disable or enable slave CMs. When a slave CM is disabled, the slave CM is not a CM any more. Accordingly, all registered TVBD networks or devices need to be re-connected to the master CM, which is achieved by performing hand-off between the salve CM and the slave CM.

Upon receiving all registered information of the TVBD networks or devices from the slave CM, the master CM may notify the TVBD networks or the devices of a new CM address.

The determination or decision of the trigger condition may be performed by a CM or a CDIS.

Figure 13:
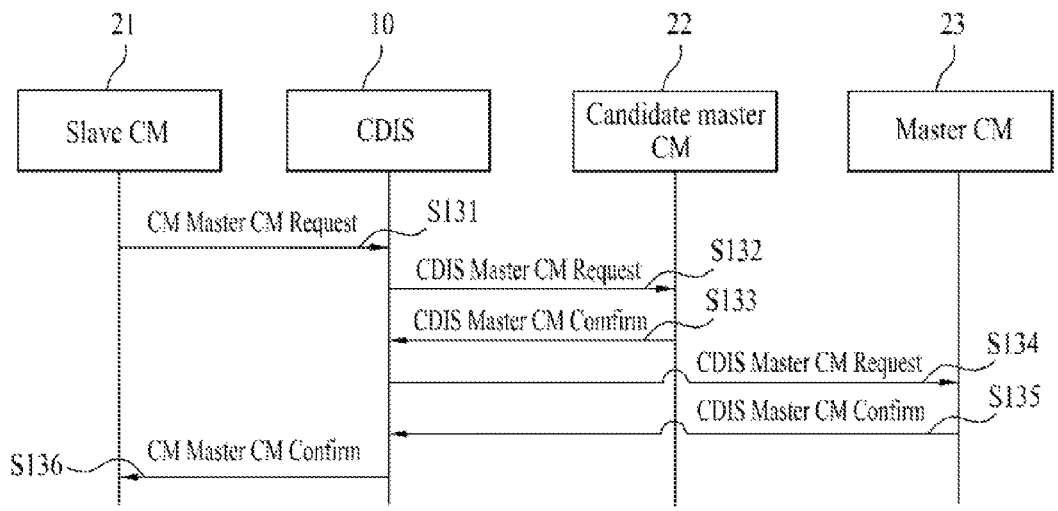
FIG. 13 illustrates a master management device selecting method according to an embodiment of the present invention.
Figure 13:
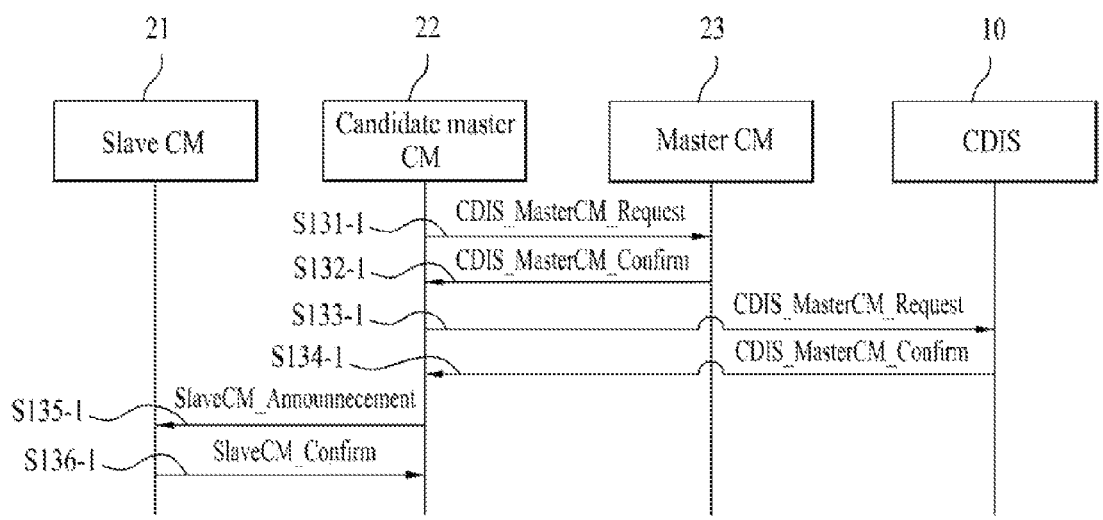

FIG. 13 illustrates a master management device selecting method according to an embodiment of the present invention. FIG. 13(a) is a flowchart of a method trigged according to a request of a candidate slave management device. FIG. 13(b) is a flowchart of a method triggered directly by a CDIS.

First, FIG. 13(a) will be described. When the aforementioned trigger condition is satisfied, the CM 21 to be a slave CM may request the CDIS 10 to select a master CM (S131).

For the master CM selection request, the slave CM 21 may transmit a master CM selection request message, for example, a CM_MaterCM_Request message to the CDIS 10. Then the CDIS 10 may select a candidate master CM and transmit a request message for requesting the selected candidate master CM to be a master CM, for example, a CDIS_MasterCM_Request message, to the candidate master CM 22 (S132). Upon receiving the CDIS_MasterCM_Request message, the candidate master CM 22 may transmit a confirmation message for the CDIS_MasterCM_Request message, for example, a CDIS_MasterCM_Confirm message, to the CDIS 10 (S133). The CDIS_MasterCM_Confirm message indicates whether the candidate master CM 22 accepts the request for the master CM. When a state of the CDIS_MasterCM_Confirm message indicates success, the CDIS 10 may transmit a confirmation message indicating that the candidate master CM 22 is a master slave, for example, a CM_MasterCM_Confirm message, to the slave CM 21 (S136).

When a state of the CDIS_MasterCM_Confirm message indicates failure, the CDIS 10 may select a next candidate master CM and transmit a CDIS_MasterCM_Request message to a newly selected candidate CM 23 (S134). Steps S134 and S135 are the same as steps S132 and S133 and thus their description will be omitted herein.

FIG. 13(b) will be described below. When the aforementioned trigger condition is satisfied, the CDIS 10 itself may initiate the master CM selection process. The CDIS 10 may select a candidate master CM based on a monitoring state of CMs registered to the CDIS 10. Then the CDIS 10 may transmit a message for requesting the selected candidate master CM 22 to be a master CM, for example, a CDIS_MasterCM_Request message (S131-1). Upon receiving the CDIS_MasterCM_Request message, the candidate master CM 22 may transmit a confirmation message for the CDIS_MasterCM_Request message, for example, a CDIS_MasterCM_Confirm message, to the CDIS 10 (S132-1). The CDIS_MasterCM_Confirm message indicates whether the candidate master CM 22 accepts the request for the mater CM. When a state of the CDIS_MasterCM_Confirm message is success, the CDIS 10 may transmit, to slave CMs including the slave CM 21, a message indicating that the candidate master CM 22 is selected as a master CM and/or the corresponding slave CMs is set to slave CM, for example, a SlaveCM_Announcement message (S135-1). The SlaveCM_Announcement message is a message that is transmitted to slave CMs from a CDIS and indicates that the corresponding CMs are set to slave CMs. A source ID of the SlaveCM_Announcement message is a CDIS ID and a destination ID is a CM ID. The SlaveCM_Announcement message has the following payload.

TABLE 5

| Information element | Data type | Description |
| --- | --- | --- |
| masterCMID | CX ID | CM ID of Master CM |

The slave CMs 21 that receives the SlaveCM_Announcement message may transmit a confirmation message for the SlaveCM_Announcement message, for example, a SlaveCM confirm message, to the CDIS 10. The SlaveCM confirm message is transmitted to a CDIS from a CM and is used to check that the CM initiates an operation as a slave CM. A source ID of the SlaveCM confirm message is a CM ID and a destination ID is a CDIS ID. The SlaveCM confirm message has no payload.

Steps S131-1 to S134-1 of FIG. 13(b) are the same or similar to steps S132 to S135 of FIG. 13(a) and thus the description for the steps S132 to S135 of FIG. 13(a) can also be applied to FIG. 13(b) unless specifically described herein to avoid repetition throughout this specification.

The method according to the present invention that has been described thus far may be embodied in the form of software, hardware, or a combination thereof. For example, the method according to the present invention may be stored in a storage medium (e.g., a mobile terminal internal memory, a flash memory, a hard disk, etc.) and may be embodied in the form of codes or commands in a software program that can be executed by a processor (e.g., a mobile terminal internal micro processor).

A UE or device according to embodiments of the present invention as an example of hardware may be interpreted as including a mobile terminal (e.g., a UE, a mobile equipment (ME), a user terminal (UT), a subscriber station (SS), a mobile subscriber station (MSS), a wireless device, a handheld device, and an access terminal (AT)), a digital television (TV), a global positioning system (GPS) navigation player, a portable gaming player, an MP3 player, other home appliances, etc. by which the aforementioned embodiments are embodied.

Thus far, an device and method according to at least one of the disclosed embodiments of the present invention has been described with reference to the exemplified drawings. However, it will be apparent to those skilled in the art that the present invention is not limited by the disclosed embodiments of the present invention and the drawings and various modifications may be formed by those skilled in the art within the scope of the technical spirit of the present invention.

Configurations and methods according to the aforementioned embodiments are not limited to the aforementioned method for selecting a master device in a coexistence system. The aforementioned embodiments may be entirely or partially combined and configured to form various modifications.

Terms or words used herein shall not be limited to having common or dictionary meanings, and have the meanings corresponding to technical aspects of the embodiments of the present invention so as to most suitably express the embodiments of the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Embodiments of the present invention are applicable to various apparatuses or terminals in a wireless communication system.

The invention claimed is:
1. A method for registering television white space (TVWS) devices for coexistence of TVWS devices in a TVWS, the method performed by a server and comprising:
receiving one or more registration request messages for registration or update registration of one or more TVWS devices from at least one management device;
performing the registration or update registration of one or more TVWS devices; and
in response to the one or more registration request messages, transmitting one or more registration response messages to the at least one management device,
wherein the transmitting one or more registration response messages to the at least one management device includes transmitting identical registration response messages to at least two management devices.

2. The method according to claim 1, wherein
the reason field is set to 1 if the number of TVWS devices which have currently registered to the server is same as the maximum number of TVWS devices which the server is capable to register, and
the reason field is set to 2 if information of the registration or the update registration is wrong.

3. The method according to claim 1, wherein each registration request message includes at least one of the maximum number of TVWS devices that can be controlled by a corresponding management device, a geo-location and coverage radius of the corresponding management device.

4. The method according to claim 1, wherein
if the registration or the update registration is successfully performed, the status field is set to success; and
if the registration or the update registration is not successfully performed, the status field is set to failure.

5. The method according to claim 1, wherein if the registration or the update registration is successfully performed for at least one TVWS device among the one or more TVWS devices, the identifier field of the registration response message for the at least one TVWS device further includes an identifier of an interface device connected to the at least one TVWS device.

6. The method according to claim 1, wherein if the registration or the update registration is not successfully performed for at least one TVWS device among the one or more TVWS devices, the identifier field of the registration response message for the at least one TVWS device further includes an identifier of an interface device connected to the at least one TVWS device.

7. The method according to claim 1, wherein
the identical registration response messages are transmitted to management devices which have transmitted the registration request messages for the TVWS devices of which the registration or the update registration is success.

8. The method according to claim 1, wherein
the identical registration response messages are transmitted to management devices which have transmitted the registration request messages for the TVWS devices of which the registration or the update registration is failed due to same reason.

9. A method for registering television white space (TVWS) devices for coexistence of TVWS devices in a TVWS, the method performed by a first management device and comprising:
receiving a first registration request message for registration or update registration of a TVWS device from at least one interface device connected to the TVWS device;
transmitting a second registration request message for the registration or the update registration to a server based on the first registration request message, the registration or the update registration being performed by the server in response to the second registration request message;

receiving a first registration response message from the server in response to the second registration request message;

performing the registration or the update registration based on the first registration response message, and transmitting a second registration response message to the at least one interface device, wherein the first registration response message is identical to a second registration response message which is transmitted from the server to a second management device.

10. The method according to claim 9, wherein the reason field is set to 1 if the number of TVWS devices which have currently registered to the server is same as the maximum number of TVWS devices which the server is capable to register, and the reason field is set to 2 if information of the registration or the update registration is wrong.

11. The method according to claim 9, wherein the first registration request message includes an identifier (ID) or a serial number (SN) of the TVWS device.

12. The method according to claim 9, wherein the second registration request message includes at least one of the maximum number of TVWS devices that can be controlled by the first management device, a geo-location and coverage radius of the first management device.

13. The method according to claim 9, wherein if the registration or the update registration is successfully performed by the server, the status field of the first registration response message is set to success; and if the registration or the update registration is not successfully performed, the status field of the first registration response message is set to failure.

14. The method according to claim 9, wherein if the registration or the update registration of the TVWS device is successfully performed by the server, the identifier field of the first registration response message further includes an identifier of an interface device connected to the TVWS device.

15. The method according to claim 9, wherein if the registration or the update registration of the TVWS device is not successfully performed by the server, the identifier field of the first registration response message further includes an identifier of an interface device connected to the TVWS device.

16. The method according to claim 9, wherein if the number of TVWS devices which have currently registered to the first management device is same as the maximum number of TVWS devices that can be controlled by the first management device, the second registration request messages is not transmitted to the server.

* * * * *